United States Patent [19]

Hector, Sr. et al.

[11] Patent Number: 5,009,569
[45] Date of Patent: Apr. 23, 1991

[54] WIND ENERGY COLLECTION SYSTEM

[76] Inventors: Francis N. Hector, Sr.; Francis N. Hector, Jr., both of P.O. Box 81024, Las Vegas, Nev. 89180

[21] Appl. No.: 382,908

[22] Filed: Jul. 21, 1989

[51] Int. Cl.$^5$ .............................................. F03B 15/06
[52] U.S. Cl. ...................................... 415/4.1; 415/4.2
[58] Field of Search ................ 416/4 R, 3 R; 415/2.1, 415/4.1, 4.3, 4.5, 905, 908, 4.2, 4.4, 907

[56] References Cited

U.S. PATENT DOCUMENTS

| | | | |
|---|---|---|---|
| 648,442 | 5/1900 | Scott | 415/4.1 |
| 744,065 | 11/1903 | Gran | 415/3 R |
| 757,800 | 4/1904 | Williams | 415/4.1 X |
| 1,315,595 | 9/1919 | Clark | 415/4.4 |
| 1,531,964 | 3/1925 | McHenry | 415/4.1 |
| 1,534,799 | 4/1925 | Maine | 415/4.1 |
| 1,935,097 | 11/1933 | Nelson | 415/4.2 |
| 1,973,509 | 9/1934 | Santarsiero | 415/130 |
| 3,807,890 | 4/1974 | Wright | 415/2 |
| 4,019,828 | 4/1977 | Bunzer | 415/122 R |
| 4,084,918 | 4/1978 | Pavlecka | 415/2.1 X |
| 4,127,356 | 11/1978 | Murphy | 415/2 |
| 4,191,505 | 3/1980 | Kaufman | 415/2.1 |
| 4,279,569 | 7/1981 | Harloff | 415/52 |
| 4,350,900 | 9/1982 | Baughman | 290/55 |

FOREIGN PATENT DOCUMENTS

| | | | |
|---|---|---|---|
| 331377 | 1/1921 | Fed. Rep. of Germany | 415/4 R |
| 2539058 | 3/1977 | Fed. Rep. of Germany | 415/4 R |
| 2732192 | 1/1979 | Fed. Rep. of Germany | 415/4 R |
| 365045 | 6/1906 | France | 415/4 R |
| 595500 | 10/1925 | France | 415/4 R |
| 2277250 | 1/1976 | France | 415/4.5 |
| 2446391 | 9/1980 | France | 415/4.5 |
| 1268792 | 11/1986 | U.S.S.R. | 415/2.1 |
| 1278483 | 12/1986 | U.S.S.R. | 415/4.3 |
| 2185786 | 7/1987 | United Kingdom | 415/4 R |

Primary Examiner—John T. Kwon
Attorney, Agent, or Firm—George A. Bode; Michael L. Hoelter

[57] ABSTRACT

A wind-driven apparatus for the conversion of kenetic energy in the form of wind to rotational mechanical energy. This apparatus incorporates a funnel that directs wind against a collector causing it to rotate. To prevent any backpressure in the funnel or against the collector, the area immediately downstream of the collector is free of any obstacle or channeling devices. To also prevent any backpressure from developing, a series of blow-through panels form a part of the funnel which open upon the presence of high pressure—the greater the pressure, the greater the opening.

7 Claims, 5 Drawing Sheets

WIND ENERGY COLLECTION SYSTEM

BACKGROUND OF THE INVENTION

1. Field of the Invention

The present invention relates to the conversion of the kinetic energy in a moving fluid to rotational mechanical energy and more particularly to a wind driven apparatus for the generation of electricity, pumping water, or other purposes.

2. General Background

There exist numerous examples of fluid or wind driven machinery that convert kinetic energy into mechanical energy and more particularly into the rotation of a shaft or turbine. Each of these machines accomplish their intended purpose by directing the wind or the fluid against a collector causing it to rotate thereby creating the desired mechanical energy.

All such machines may be categorized differently. They may be grouped as to whether the axis of rotation of the collector is horizontal or vertical. Additionally, the rotor blades or vanes of the collector may be of the 'open' or 'closed' variety. The 'open' or squirrel cage variety enables the wind to flow around and past the vanes in the manner of an air foil. They rely upon aerodynamic lift to cause rotation. Conversely, 'closed' type rotor blades rely upon the direct impact of the force of the wind on the surface of the blade to cause rotation.

Alternately, these machines may be classified in accordance with how the wind or fluid is directed towards the collector. At least four different groupings of this type may be formed. The first group includes those that are merely placed in a flow stream and are unable to adjust to a change in direction of the flow stream. An example of this type is U.S. Pat. No. 3,807,890 to Wright. These devices are predominantly water driven rather than wind driven since water is easily channeled and does not often change directions.

The second type relies upon an upstream funnel to direct and concentrate the flow stream. The theory being that as the funnel cross-sectional area decreases the wind speed increases to accommodate the same volume of flow. Unfortunately, most such designs do not take into account the difference existing between ambiant air pressure and the pressures found inside the funnel. Consequently, the speed and volumn of the funneled flow may be less than anticipated. Additionally, these machines direct the air flow to impinge upon a relatively small area of the collector necessitating a rather high energy exchange rate. Some typical examples of these type machines are U.S. Pat. No. 4,127,356 to Murphy, Pat. No. 4,019,828 to Bunzer, and Pat. No. 1,935,097 to Nelson.

The third type also utilizes mild funnels to capture more wind, but these machines also incorporate upstream baffles to direct the flow against a larger collector area. These machines may perhaps be slightly more efficient, but since baffling of any type removes energy from the flow stream, a higher wind speed is needed. Examples of these machines are U.S. Pat. No. 4,279,569 to Harloff and Pat. No. 1,973,509 to Santarsiero.

The fourth and last type are those that do more that simply baffle the incoming flow stream, they channel it by turning it more than ninety (90°) degrees for maximum collector impact. As can be readily expected, such channeling and drastic turning of the flow steam significatntly reduces the available energy in the flow steam. Examples of these machines are U.S. Pat. No. 4,350,900 to Baughman and Pat. No. 1,315,595 to Clark.

It is thus an object of this invention to provide an efficient means of extracting kenetic energy from the wind and transforming this energy into mechanical rotation. Another object of this invention is to provide a wind generator that directs large volume of air towards a collector yet accomplishes this task with little loss of energy. A further object of this invention is to provide a machine that automatically pivots to intercept the wind as it shifts directions. Yet another object of this invention is to provide a low cut-in threshold and a high cut-out threshold so as to convert a broader range of wind speed to mechanical energy. These and other features of this invention will become apparent upon further investigation.

SUMMARY OF THE PRESENT INVENTION

The preferred embodiment of the apparatus of the present invention solves the aforementioned problems in a straight forward and simple manner. What is provided is a wind-driven apparatus for generating rotational mechanical energy that consists of a closed rotatable drum journeled to a support and having a horizontal axis of rotation. A plurality of closed, elongated vanes are secured to the outer surface of this cylinder and, in this embodiment, are oriented parallel to the horizontal axis of rotation (a vertical orientation is also possible). Each of these elongated vanes curve uniformly outward away from the cylinder thereby forming a scoop or concave impingement area next to the cylinder. Upstream of the cylinder is an intake funnel secured to the support and configured to collect and direct wind towards the vanes. This funnel is configured having top and bottom walls that terminate on opposite sides of the horizontal axis of rotation. Forming a part of this funnel are a series of blow-through panels that are biased closed but begin to open at a preselected wind pressure. The support which supports the funnel and cylinder is, in turn, pivotally secured to a base, this support being pivotal about a generally vertical axis. Immediately downstream of the cylinder is an open exhaust area free of any obstruction or further channeling of the spent or de-energized wind. Also, incorporated into this apparatus are alignment means for properly aligning the funnel with respect to the direction of the wind.

BRIEF DESCRIPTION OF THE DRAWINGS

For a further understanding of the nature and objects of the present invention, reference should be had to the following description taken in conjunction with the accompanying drawing in which like parts are given like reference numerals and, wherein.

DETAILED DESCRIPTION OF THE PREFERRED EMBODIMENT

Figure 1:
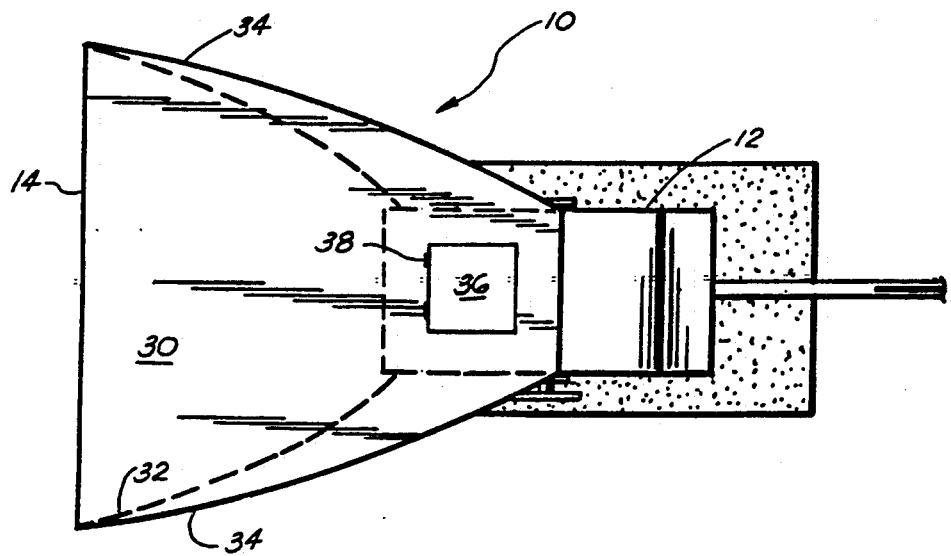
FIG. 1 is a top planar view of the preferred embodiment of the apparatus of the present invention.
Figure 2:
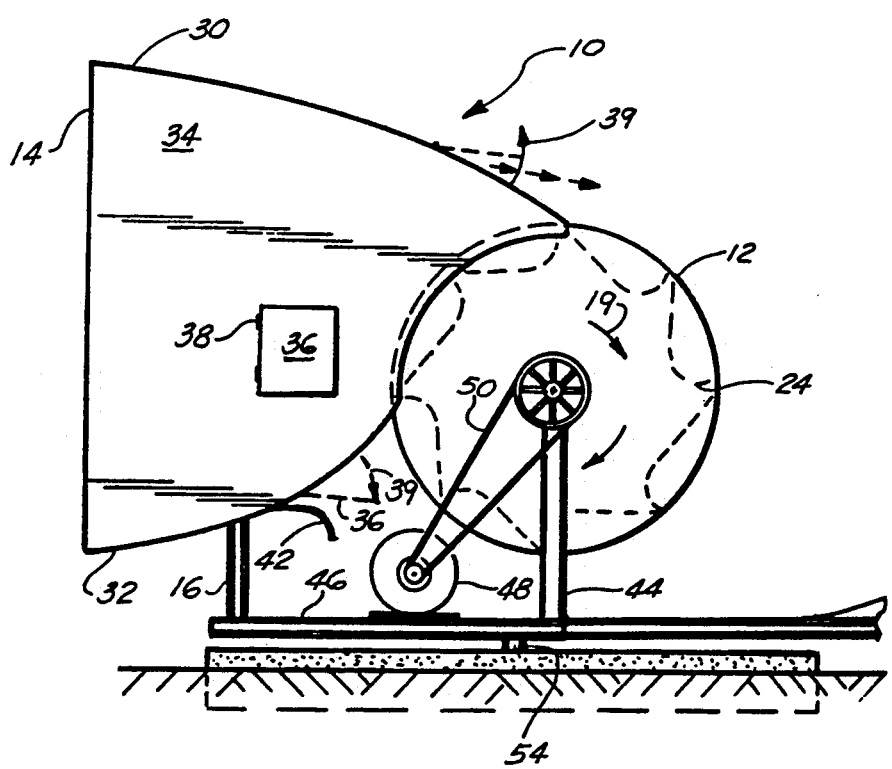
FIG. 2 is a side view of the embodiment of FIG. 1.
Figure 4:
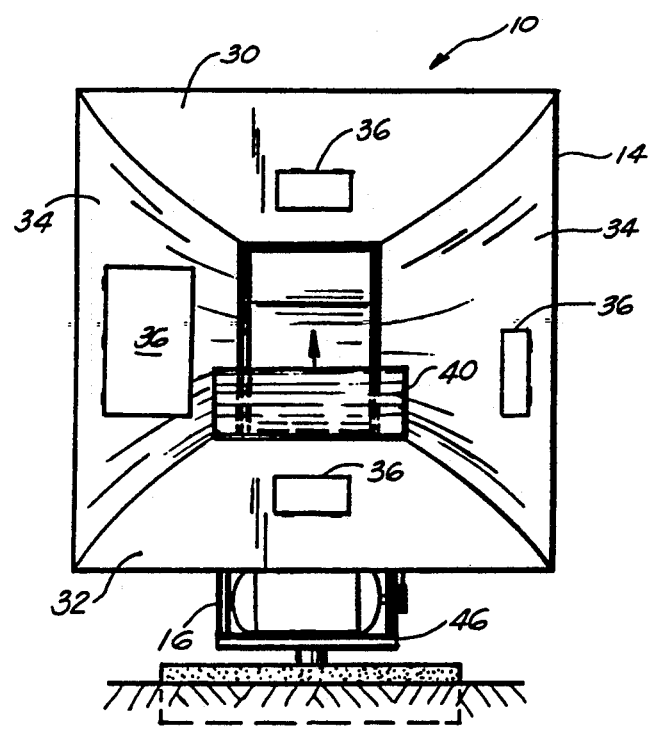
FIG. 4 is a front view of the embodiment of FIG. 1.
Figure 3:
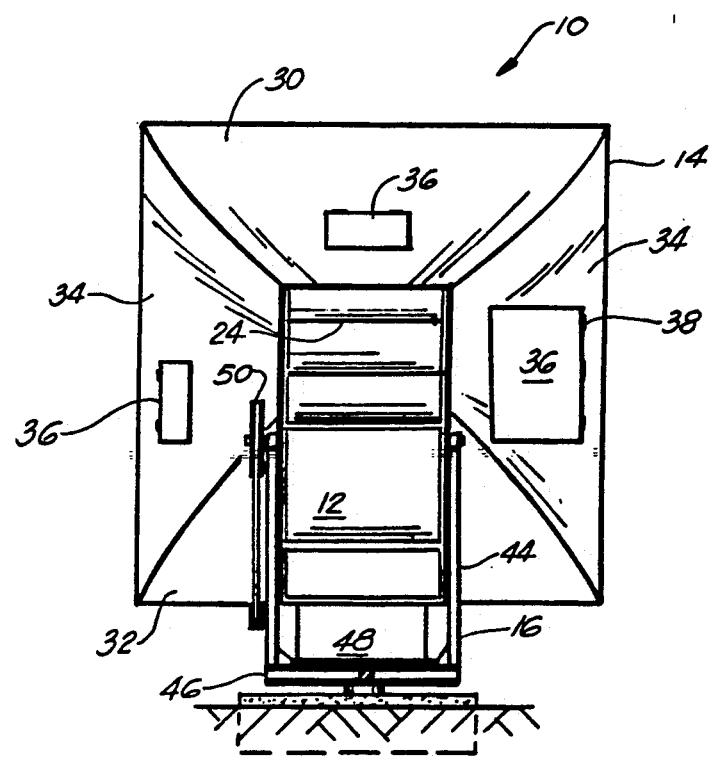
FIG. 3 is a rear view of the embodiment of FIG. 1.
Figure 5:
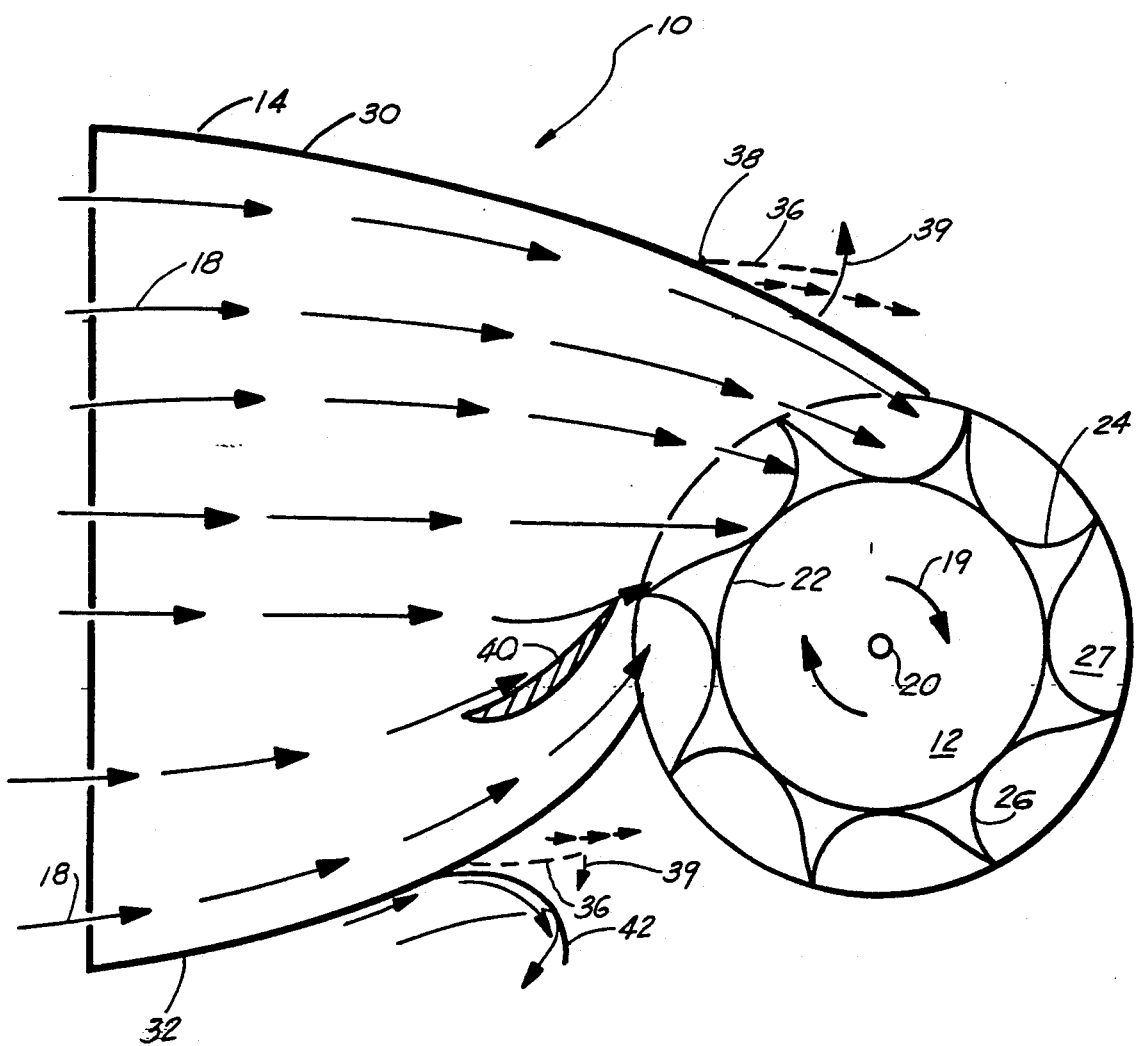
FIG. 5 is a pictorial side view, partially cut away, illustrating the operation of the wind machine.

Referring now to the drawings, and in particular FIGS. 1-5 and 8, the apparatus of the present invention is designated generally by the numeral 10. Apparatus 10 is generally comprised of collector 12, funnel 14, and support 16. As illustrated, collector 12 is of the closed variety and is oriented perpendicular to flow stream or wind 18. Collector 12 rotates about a horizontal axis (ARROWS 19) which is represented by shaft 20 that is journeled to support 16. Should it be desired, apparatus 10 can be configured to rotate about a vertical axis.

Collector 12 consists of closed drum or cylinder 22 having a series of elongated rotor blades or vanes 24 secured to its perimeter surface. These vanes 24, which are also of the closed variety, extend parallel to shaft 20 along the length of cylinder 22. They curve uniformly outward, away from cylinder 22 thereby forming an impingement surface 26, enclosing impingement area 27, that flow stream 18 engages. Because of the closed nature of both vanes 24 and cylinder 22, flow stream 18 does not flow through collector 12, but instead passes around cylinder 22 thereby pressing against impingement surface 26 causing collector 12 to rotate (ARROWS 19). By forcing flow stream 18 to flow around cylinder 22 rather than permitting it to flow through cylinder 22, the torque on shaft 20 is increased as well as the rotational acceleration of vanes 24.

In this embodiment, impingement area 27 is concave having a somewhat semi-circular shape that is defined to also include a more elliptical or quarter-circle configuration. Also, it should be noted that vanes 24 may also be cups, sails, fins, or otherwise that are secured around and will impart a rotation to shaft 20.

Funnel 14, as shown, has an intake area larger in both height and width then collector 12. It consists of top 30, bottom 32, and sides 34 all of which have a convex curvature (with respect to the outside of funnel 14). Other configurations, however, are equally possible; its main purpose being to collect a large portion of flow steam 18, concentrate this portion, and direct it towards collector 12 without it becoming "trapped" or stalled between collector 12 and funnel 14.

The unique curvature of funnel 14 as shown aids in channeling flow stream 18 towards vanes 24. Top 30 terminates downstream of shaft 20 while bottom 32 terminates upstream of shaft 20. In this fashion and because they converge irregularly towards collector 12, flow stream 18 is directed specifically against impingement surface 26. Due to the spacing between the terminus of top 30 and bottom 32, nearly half or more of vanes 24 on cylinder 22 are exposed to flow stream 18 at any given time.

A series of blow-through panels 36 are positioned about top 30, bottom 32 and sides 34 of funnel 14. These panels 36 are normally biased closed by springs 38 and they only begin to pivot open (ARROWS 39) when the pressure against the inside of funnel 14 reaches or exceeds a given amount. Generally, panels 36 are located near collector 12 in the narrower portion of funnel 14 as that is where any build-up of pressure needs to be relieved. In this embodiment, a panel 36 is located in the terminating region of both top 30 and bottom 32 immediately adjacent collector 12. Also, on sides 34, oppositely spaced panels 36 are positioned intermediate the inlet opening and collector 12. In all of these locations, panels 36 are oriented to pivot outward in the direction of ARROW 39, away from funnel 14, this direction being consistent with the direction of flow stream 18. In other embodiments panels 36 may be of unequal size (or absent on one side) in order to assist in rotating apparatus 10 "off-wind" during periods of high wind speeds.

Inside funnel 14 and near bottom 32 is deflector vane 40. Deflector vane 40 compliments bottom 32 in that it aids in directing the funnelled flow stream 18 against vane 24 for maximum impact and greater efficiency. Although only one deflector vane 40 is shown, more than one may be used.

Outside funnel 14 and secured to bottom 32 is wind deflector 42. This wind deflector 42 curves outward in a direction away from the convex curvature of bottom 32. It can also extend perpendicular (or nearly so) to bottom 32. Wind deflector 42 deflects flow stream 18 away from the underneath side of funnel 14 thereby preventing flow stream 18 from impinging upon collector 12 outside of funnel 14. Wind deflector 42 also prevents any turbulance in the area of blow-out panel 36 at the terminating end of bottom 32 as well as the location where vanes 24 re-enter funnel 14 after rotating around shaft 20. Its purpose is to reduce and/or eliminate drag or any other opposing force on collector 12.

As illustrated, the immediate downwind side of collector 12 is open to ambiant pressure. There is no housing, baffle, or deflector vane to further direct flow stream 18 immediately after it passes around collector 12. Consequently, no backpressure can be developed that would reduce the volume or force of flow stream 18 passing through funnel 14. (This is not to say that such devices cannot be used, it is just that they are not used if such use will create backpressure that reduces the volumn or flow of flow stream 18 through funnel 14 and against collector 12.) The configuration of top 30 and wind deflector 42 prevents any wind from striking collector 12 in a manner inconsistent with its normal direction of rotation.

Both collection 12 and funnel 14 are secured to support 16. As indicated, support 16 consists of upright members 44 secured to platform 46. A generator or other piece of machinery 48 is mounted on platform 46 underneath funnel 14. This generator 48 would normally be coupled by a belt and pulley arrangement 50 to shaft 20 of collector 12. Consequently, as shaft 20 rotates, so does generator 48, and by skillful selection of belt and pulley arrangement 50, the ratio of the turning of the one can be adjusted to conform to the acceptable turning speed of the other. As is obvious, the turning speed of shaft 20 will not always be consistent, thus the need for a generator 48 that can accept a wide range of revolutions per minute.

Support 16 is, in turn, pivotally secured to base 52 enabling it to pivot in the direction of arrow 53. Support 16 may pivot about base 52 via an adjustable or a fixed height column 54 as shown or it may pivot about a circular track on wheels (not shown). In whatever fashion chosen, wind machine 10 is designed so that funnel 14 can rotate as needed to orient itself with flow stream 18 and to pivot itself out of flow stream 18 during periods of high wind speeds.

Figure 6:
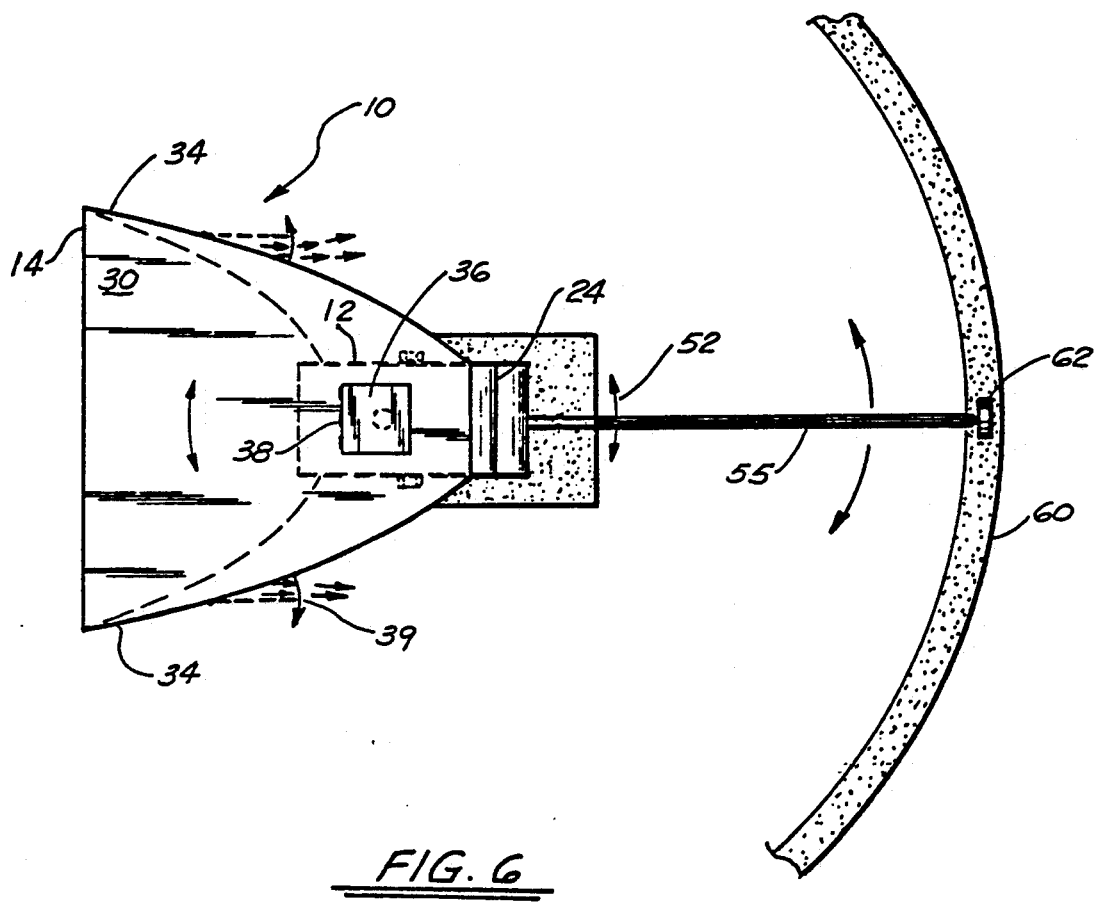
FIG. 6 is a top planar view of the wind machine illustrating the wind foil and its track.
Figure 7:
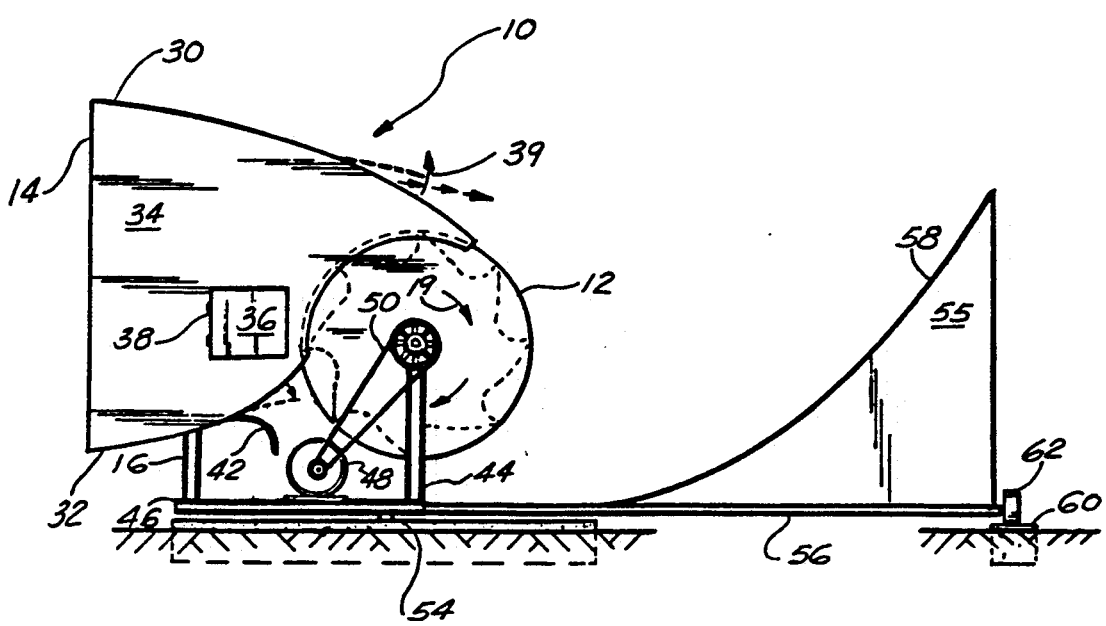
FIG. 7 is a side view of the wind machine illustrating the wind foil.
Figure 8:
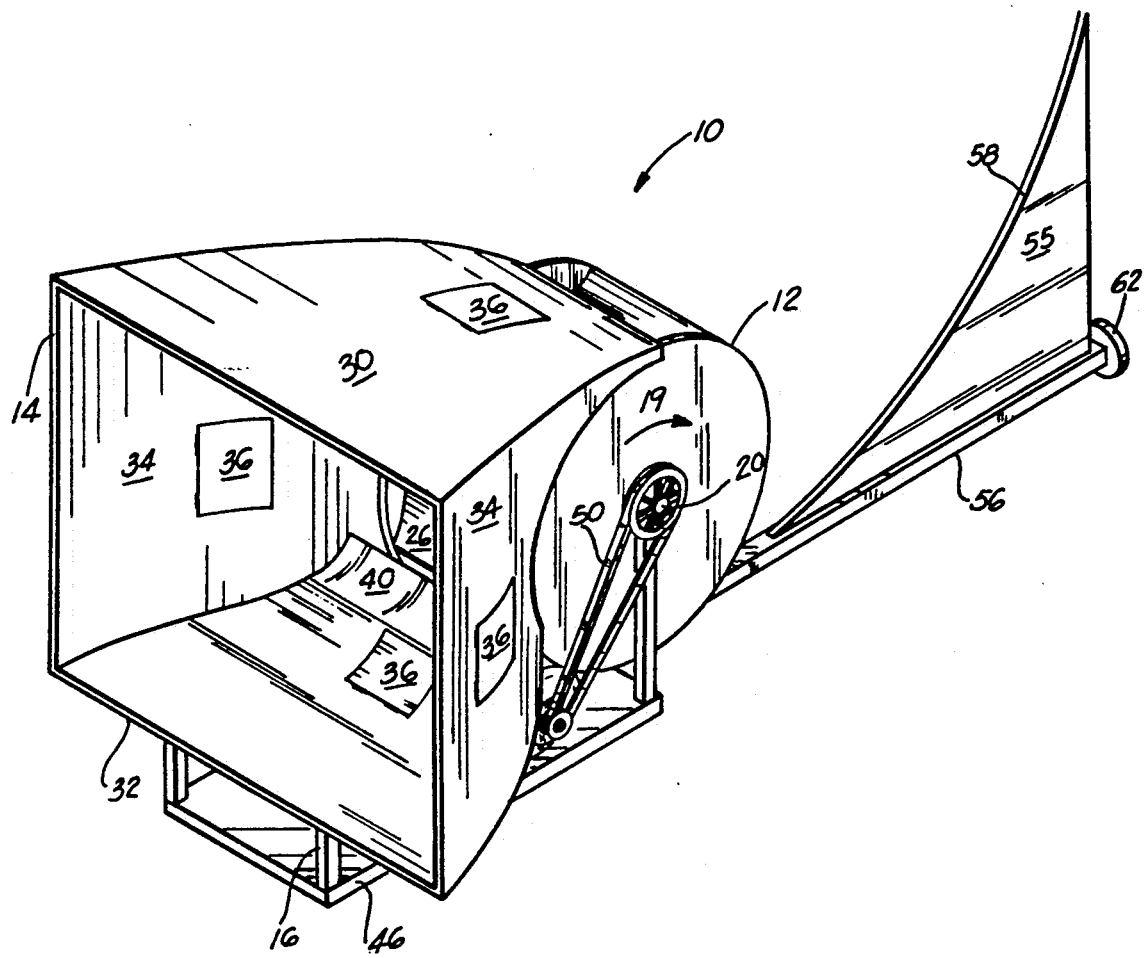
FIG. 8 is a top perspective view of the embodiment of FIG. 7.

Referring now to FIGS. 6 and 7, and to aid in such orientation, wind machine 10 incorporates direction vane 55. As shown, direction vane 55 is secured to platform 46 of support 16 downstream of collector 12, it may also be secured to upright members 44 or even journeled to shaft 20 if desired. Direction vane 55 incorporates a generally horizontal member 56 supportng a large upward curving wind foil 58. To support the weight of wind foil 58, either it or the end of horizontal member 56 (as shown) is mounted on track 60 via wheels 62. As flow stream 18 strikes the surface of wind foil 58, it is rotated or moved along track 60 until the resultant horizontal force on wind foil 58 is parallel to horizontal member 56. Consequently, as wind foil 58 is repositioned along track 60, its movement causes wind machine 10 and funnel 14 to also pivot about column 54 for proper orientation and alignment.

As an option, a micro-processor may be connected to the surface of wind foil 58 and also to a motor that is capable of pivoting wind machine 10 in response to the force and direction of flow stream 18. It should also be noted that the embodiment shown is with respect to collection 12 rotating about a horizontal axis, however, it can also be adapted to rotate about a vertical axis or any other axis in betweeen if desired. In order to do so, support 16 would still be positioned under wind machine 10 with all the other features described above remaining relatively the same.

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in a limiting sense.

What is claimed as invention is:

1. A wind-driven apparatus for generating rotational mechanical energy from a wind flow stream comprising:
    (a) a closed rotatable cylinder journeled to a supporting member and having a first axis of rotation;
    (b) a plurality of closed elongated vanes positioned about the entire circumference of and secured to said cylinder and oriented parallel to said first axis of rotation, each of said vanes curving outwardly away from said cylinder and meeting at adjacent ends thereof, thereby forming concave adjacent wind impingement areas circumferentially about said cylinder, thereby preventing the flow of said wind stream past said cylinder;
    (c) an intake funnel secured to said supporting means and configured to converge on said closed rotatable cylinder to collect and direct said wind flow stream towards said vanes, said funnel having top, bottom and side walls and being open at the front, said walls of said funnel converging irregularly to direct said wind flow stream to said wind impingement areas, said top wall of said intake funnel terminating downstream of said horizontal axis of rotation and said bottom wall terminating upstream of said horizontal axis of rotation;
    (d) a plurality of blow-through panels forming a part of said funnel and biased to begin opening at a pre-selected wind flow stream pressure;
    (e) said supporting member being secured to a base member and being pivotal about a second axis of rotation, said second axis being generally perpendicular to said first axis of rotation;
    (f) an open exhaust area immediately downstream of said first axis of rotation, said exhaust area being free of any immediate obstruction and other means for channeling of said funnelled wind flow stream; and,
    (g) means for aligning said open front of said funnel generally parallel to the direction of said wind flow stream, said alignment means including an elongated member connected to said supporting member at its first proximate end and elongated in the direction of said wind flow stream to a second distal end having means for allowing the pivoting of said supporting member about said second axis of rotation, said means for allowing pivoting comprising a wheel member mounted at said distal end of said elongated member and confined to motion along a pre-determined arcuate track; and, a second vane member mounted to and depending vertically upwardly from said elongated member, said second vane member increasing in vertical extent from said proximate end to said distal end of said elongated member.

2. A wind driven apparatus as set forth in claim 1, wherein said first axis of rotation is horizontal and said second axis of rotation is vertical.

3. A wind driven apparatus as set forth in claim 1, wherein said intake funnel comprises, from the outside, convex side, top and bottom walls.

4. A wind driven apparatus as set forth in claim 3 further comprising a deflector vane secured inside said intake funnel and in alignment with said bottom wall, said deflector vane complimenting said bottom wall in that both said deflector vane and said bottom wall direct said funneled wind against said vanes.

5. A wind-driven apparatus as set forth in claim 4 further comprising a wind deflector secured to the exterior of said bottom wall, said wind deflector directing any non-funneled wind to by-pass said closed rotatable cylinder thereby avoiding impact with said vanes in a direction opposite to the normal direction of rotation of said vanes.

6. A wind-driven apparatus as set forth in claim 5, wherein at least one said blow-through panel is secured in each said top wall and said bottom wall of said funnel, both said blow-through panels being positioned adjacent said cylinder and opening outward away from said funnel.

7. A wind-driven apparatus as set forth in claim 6, wherein said blow-through panels are normally spring biased in the closed position.

* * * * *